United States Patent
Rintelmann et al.

(10) Patent No.: US 10,094,412 B2
(45) Date of Patent: Oct. 9, 2018

(54) METHOD OF CONNECTING A PRESS-IN BOLT WITH A METAL SHEET AND COVER ELEMENT FOR CARRYING OUT THE METHOD

(71) Applicant: Audi AG, Ingolstadt (DE)

(72) Inventors: Jochen Rintelmann, Dessau (DE); Patrick Feldhan, Neckarsulm (DE); Benjamin Hans, Kösching (DE); Norbert Hornbostel, Talheim (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/730,440

(22) Filed: Oct. 11, 2017

(65) Prior Publication Data

US 2018/0031024 A1 Feb. 1, 2018

Related U.S. Application Data

(62) Division of application No. 14/749,051, filed on Jun. 24, 2015, now Pat. No. 9,816,548.

(30) Foreign Application Priority Data

Jun. 25, 2014 (DE) .................. 10 2014 009 410

(51) Int. Cl.
| | |
|---|---|
| *F16B 37/06* | (2006.01) |
| *B23P 19/06* | (2006.01) |
| *F16B 17/00* | (2006.01) |
| *F16B 37/14* | (2006.01) |
| *F16B 37/00* | (2006.01) |

(52) U.S. Cl.
CPC .......... *F16B 37/068* (2013.01); *B23P 19/064* (2013.01); *F16B 37/14* (2013.01); *F16B 37/005* (2013.01)

(58) Field of Classification Search
CPC ...... F16B 37/068; F16B 37/14; F16B 37/005; B23P 19/064
See application file for complete search history.

(56) References Cited

U.S. PATENT DOCUMENTS

| | | | | |
|---|---|---|---|---|
| 4,435,111 A | * | 3/1984 | Mizusawa | ........... F16B 37/0842 411/21 |
| 4,671,717 A | * | 6/1987 | Fukuhara | .............. F16B 37/043 411/182 |
| 4,756,654 A | | 7/1988 | Clough | |
| 4,770,582 A | | 9/1988 | Junemann et al. | |

(Continued)

FOREIGN PATENT DOCUMENTS

| | | |
|---|---|---|
| CN | 102686892 | 9/2012 |
| CN | 103128181 | 6/2013 |

(Continued)

*Primary Examiner* — John C Hong

(74) *Attorney, Agent, or Firm* — Henry M. Feiereisen LLC

(57) ABSTRACT

In a method for connecting a press-in bolt with a metal sheet, the metal sheet is positioned upon a cover element of a joining tool. The press-in bolt is forced by the joining tool in a pilot hole of the metal sheet as the metal sheet is supported by the cover element in its capacity as a die, until a head portion of the press-in bolt rests upon one side of the metal sheet and the cover element is pressed upon a shaft portion of the press-in bolt and radially deformed to rest upon another opposite side of the metal sheet.

6 Claims, 4 Drawing Sheets

(56) References Cited

U.S. PATENT DOCUMENTS

| | | | |
|---|---|---|---|
| 4,850,778 A * | 7/1989 | Clough | F16B 37/0842 |
| | | | 411/182 |
| 5,887,339 A | 3/1999 | Schmidt | |
| 6,238,158 B1 | 5/2001 | Clements | |
| 7,985,042 B1 | 7/2011 | Paxton | |
| 2010/0104394 A1 | 4/2010 | Kwasiborski | |
| 2011/0127761 A1 | 6/2011 | Yoshizawa et al. | |
| 2013/0000101 A1 | 1/2013 | Rintelmann et al. | |
| 2013/0117996 A1 | 5/2013 | Ducornait et al. | |

FOREIGN PATENT DOCUMENTS

| | | |
|---|---|---|
| DE | 34 06 934 | 9/1985 |
| DE | 297 20 454 | 5/1999 |
| DE | 606 30 901 | 9/2004 |
| DE | 102010027204 | 1/2012 |
| EP | 0 165 026 | 12/1985 |
| EP | 0 153 489 | 7/1987 |

\* cited by examiner

METHOD OF CONNECTING A PRESS-IN BOLT WITH A METAL SHEET AND COVER ELEMENT FOR CARRYING OUT THE METHOD

CROSS-REFERENCES TO RELATED APPLICATIONS

This application is a divisional of U.S. patent application Ser. No. 14/749,051, filed Jun. 24, 2015, which claims the priority of German Patent Application, Serial No. 10 2014 009 410.3, filed Jun. 25, 2014, pursuant to 35 U.S.C. 119(a)-(d), the disclosures of which are incorporated herein by reference in their entirety as if fully set forth herein.

BACKGROUND OF THE INVENTION

The present invention relates to a method of connecting a press-in bolt with a metal sheet, and to a cover element for carrying out the method.

The following discussion of related art is provided to assist the reader in understanding the advantages of the invention, and is not to be construed as an admission that this related art is prior art to this invention.

DE 297 20 454 U1 discloses a cap-shaped cover element for protecting a threaded shaft of a weld stud which is to be welded onto a vehicle body.

Practice has shown that cover elements for the manufacture of vehicle bodies lack adequate tightness between cover element and a metal sheet that carries a threaded bolt, to prevent penetration of contaminants, in particular when undergoing electro-deposition painting during manufacture of vehicle bodies is involved. The reason for this shortcoming is the conversion of the contact force predominantly into a friction force, when the cover element is pressed upon a threaded bolt, so that only a small proportion remains for pressing the cover element upon the metal sheet.

It would therefore be desirable and advantageous to address prior art shortcomings.

SUMMARY OF THE INVENTION

According to one aspect of the present invention, a method for connecting a press-in bolt with a metal sheet includes positioning the metal sheet upon a cover element of a joining tool, and forcing the press-in bolt by the joining tool in a pilot hole of the metal sheet as the metal sheet is supported by the cover element in its capacity as a die, until a head portion of the press-in bolt rests upon one side of the metal sheet and the cover element is pressed upon a profiled shaft portion of the press-in bolt and radially deformed to rest upon another opposite side of the metal sheet.

In accordance with the present invention, the cover element provided for the profiled shaft portion is used at the same time as a die, when the press-in bolt is pressed in. The need for a separate operating step to press the cover element upon the profiled shaft portion is thus eliminated by the dual function of the cover element. The profile of the shaft portion may, for example, be a thread.

According to another advantageous feature of the present invention, the cover element has a receiving opening for receiving the shaft portion as the press-in bolt is forced into the pilot hole, with the receiving opening having an inner circumferential surface with malleable wall sections which extend in an axial direction and are spaced from one another about the inner circumferential surface and which form an inner circle defined by a diameter which is smaller than an outer diameter of the shaft portion of the press-in bolt.

According to another advantageous feature of the present invention, the cover element can be formed in an area proximal to the receiving opening with a radial flange, and a first pressing and joining ram of the joining tool is pressed against the radial flange to thereby force the cover element upon the shaft portion of the press-in bolt. As a result, the cover element is reliably pressed upon the shaft portion at a high and constant force.

According to another advantageous feature of the present invention, a sliding sleeve can be detachably formed at an end of the cover element in an area distal to the receiving opening and is defined by an inner diameter in correspondence with an outer diameter of the cover element in a non-deformed state. The sliding sleeve can be pushed over the cover element to thereby press the cover element upon the shaft portion.

As the cover element radially expands, after being pressed against the shaft portion, the circumferential wall of the cover element is pressed radially upon the profiled shaft portion, as the sliding sleeve is pushed upwards, so that the malleable wall sections are formed into the profile of the shaft portion to an even greater extent to thereby ensure a firm interference fit between the cover element and the shaft portion. As a consequence of this interference fit, the cover element is maintained under tension against the shaft portion, when the cover element is pressed against the shaft portion, to thereby ensure a reliable and sufficient tightness between the cover element and the metal sheet that carries the press-in bolt.

According to another advantageous feature of the present invention, the sliding sleeve can be connected to the cover element via a predetermined breaking web, which breaks, when the sliding sleeve is moved over the cover element.

According to another advantageous feature of the present invention, the sliding sleeve can be moved by a second pressing and joining ram over the cover element. As the second pressing and joining ram moves the sliding sleeve, the predetermined breaking web separates from the cover element. The first pressing and joining ram maintains the high contact force upon the cover element, while the second pressing and joining ram pushes the sliding sleeve over the cover element. Thus, the contact pressure of the cover element is thus maintained in this state of the cover element as the sliding sleeve is moved upwards.

According to another advantageous feature of the present invention, the cover element can be removed from the shaft portion of the press-in bolt by engaging a tool in engagement members of the sliding sleeve. Thus, the cover element, for example, can easily be removed after undergoing a painting process. Advantageously, the profile of the shaft portion can be configured in the form of a thread so as to allow the cover element to be unscrewed from the shaft portion in a simple manner.

According to another advantageous feature of the present invention, the cover element may be cap-shaped.

According to another advantageous feature of the present invention, the cover element can be formed in an area of the receiving opening with an elastically yielding sealing lip. The tightness is hereby further enhanced.

According to another advantageous feature of the present invention, the pilot hole of the metal sheet can be formed with a protuberance. In this way, it becomes possible to realize, for example, a snap connection between the press-in bolt and the metal sheet.

According to another aspect of the present invention, a cover element includes a receiving opening and is configured for press-fitting upon a shaft portion of a press-in bolt, the receiving opening having an inner circumferential surface with axial wall sections which are spaced from one another about the inner circumferential surface and which are malleable and form an inner circle defined by a diameter which is smaller than an outer diameter of the shaft portion of the press-in bolt.

As the cover element according to the invention is pressed upon the profiled shaft portion, the malleable wall sections, which may be configured as flow ribs, are formed into the profile of the shaft portion of thread thereof.

According to another advantageous feature of the present invention, the cover element can be formed with a radial flange in an area proximal to the receiving opening, with the radial flange having a marginal area in the form of an elastically yielding sealing lip. The provision of an elastically yielding sealing lip enhances the tightness when the cover element is pressed upon the shaft portion.

According to another advantageous feature of the present invention, the cover element can be formed detachably at an end of the cover element in an area distal to the receiving opening with a sliding sleeve which is defined by an inner diameter in correspondence with an outer diameter of the cover element in a non-deformed state. The sliding sleeve can be formed with a predetermined breaking web for detachable connection with the cover element so that a separation can be realized via the predetermined breaking web, when the cover element is pushed over the shaft portion.

According to another advantageous feature of the present invention, the sliding sleeve can have engagement members for engagement by a tool. The cover element can thus be unscrewed via these engagement members, when the profile of the shaft portion is configured as thread. Advantageously, the cover element can be configured in the shape of a cap.

According to another advantageous feature of the present invention, the wall sections can be configured as flow ribs which may be evenly spaced about the circumference of the receiving opening.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
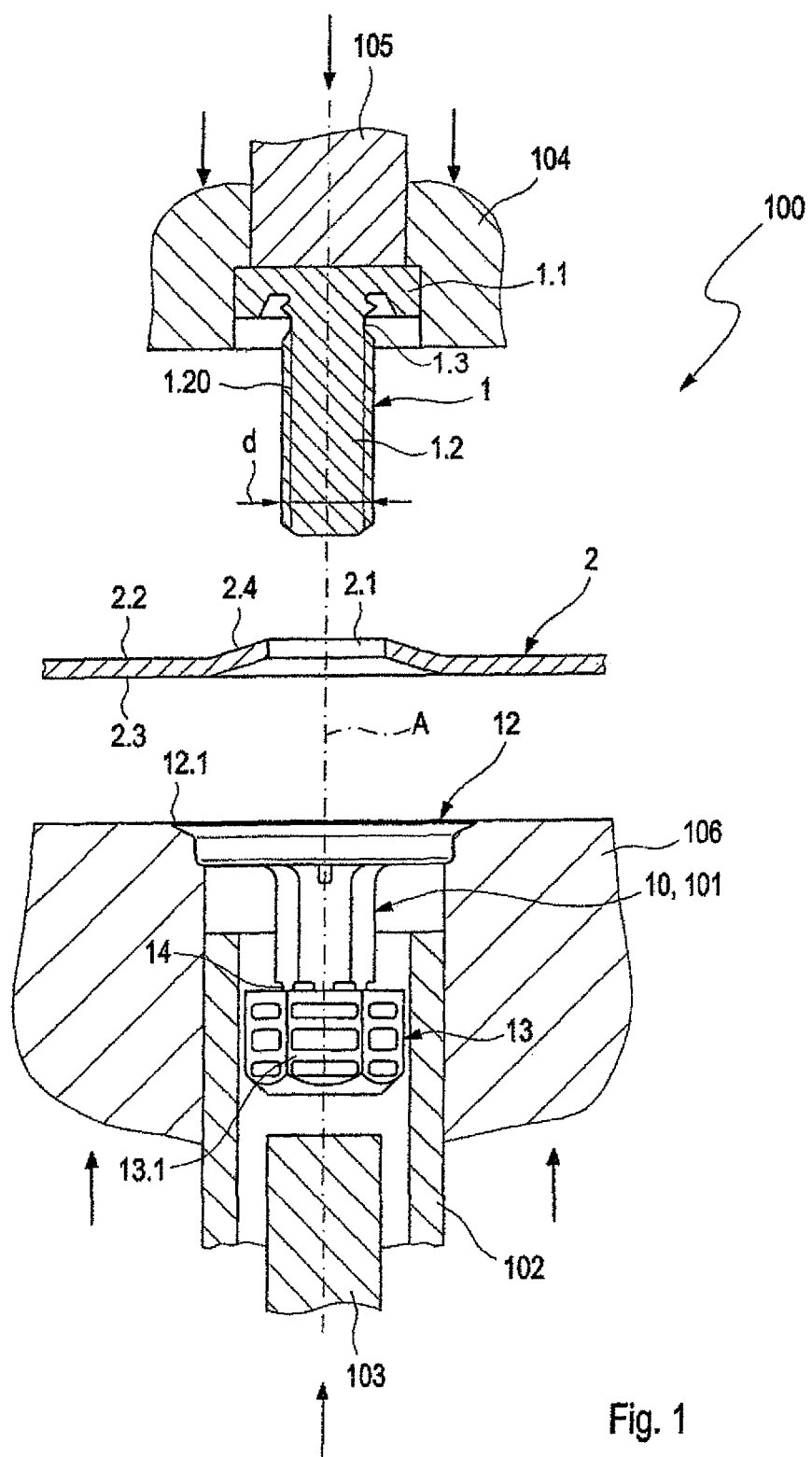
FIG. 1 is a schematic exploded illustration of an arrangement of a press-in bolt, metal sheet, and cover element in a joining tool for carrying out a method according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic exploded illustration of an arrangement of a press-in bolt 1, metal sheet 2, and cover element 10 in a joining tool, generally designated by reference numeral 100 for carrying out a method according to the present invention. The joining tool 100 is provided to implement a connection of the press-in bolt 1 with the metal sheet 2.

The press-in bolt 1 includes a plate-shaped head portion 1.1 and a shaft portion 1.2 having a profile 1.20 in the form of a thread. The joining tool 100 has a pressing and joining ram 105 which is guided in a setting head 104 for inserting the press-in bolt 1 in a pilot hole 2.1 of the metal sheet 2 via a side 2.2 thereof. The pilot hole 2.1 is hereby formed with a protuberance 2.4.

The joining tool 100 includes as die 101 the cover element 10 which not only serves as die 101 during joining of the press-in bolt 1 with the metal sheet 2 but at the same time is also pressed upon the shaft portion 1.2 of the press-in bolt 1. The cover element 10 is made of malleable plastic and is more clearly shown in FIG. 2 which is a sectional view of the cover element 10 in a direction of the symmetry axis thereof. The cover element 10 is comprised of two sections I and II, with section I constituting the actual cover element and section II represented by a sliding sleeve 13 which has a hollow cylindrical shape and is detachably formed onto the cover element 10 via a predetermined breaking web 14 at an end distal to the receiving opening 11.

The section 1 of the cover element 10 is cap-shaped and includes a receiving opening 11 by which the section I is placed over the shaft portion 1.2 of the press-in bolt 1. In the area proximal to the receiving opening 11, a radially wrap-around flange 12 is formed onto the cap-shaped section I of the cover element 10 and is provided at its margin with an elastically resilient sealing lip 12.1.

Figure 2:
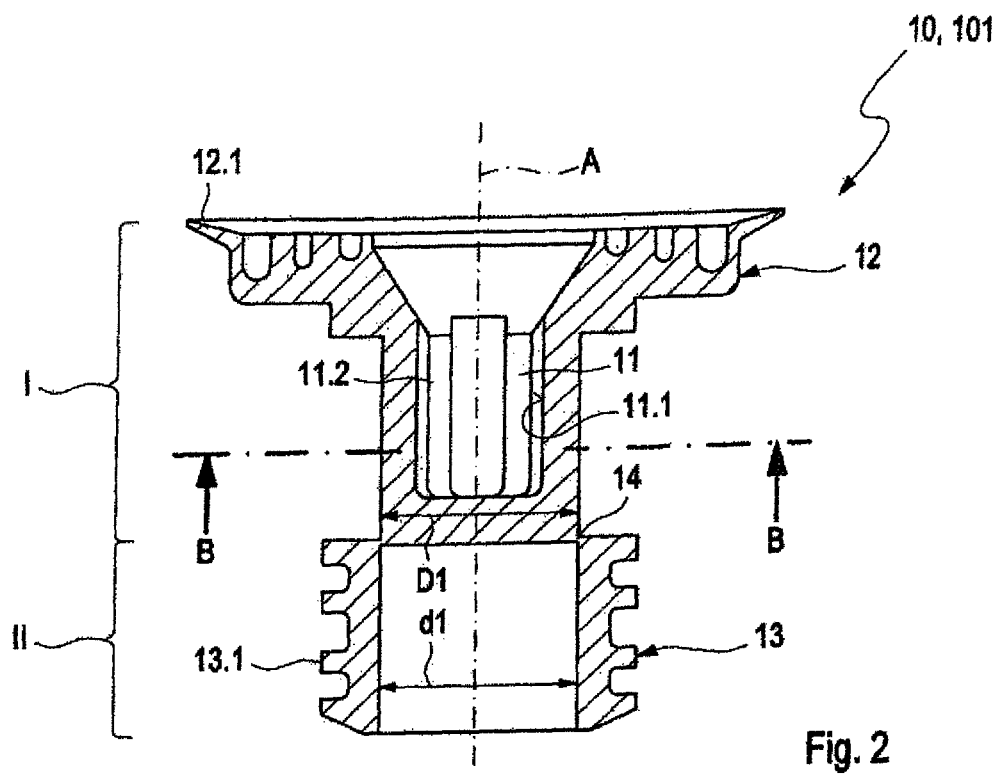
FIG. 2 is a sectional view of the cover element of FIG. 1 in a direction of the symmetry axis of the cover element.
Figure 3:
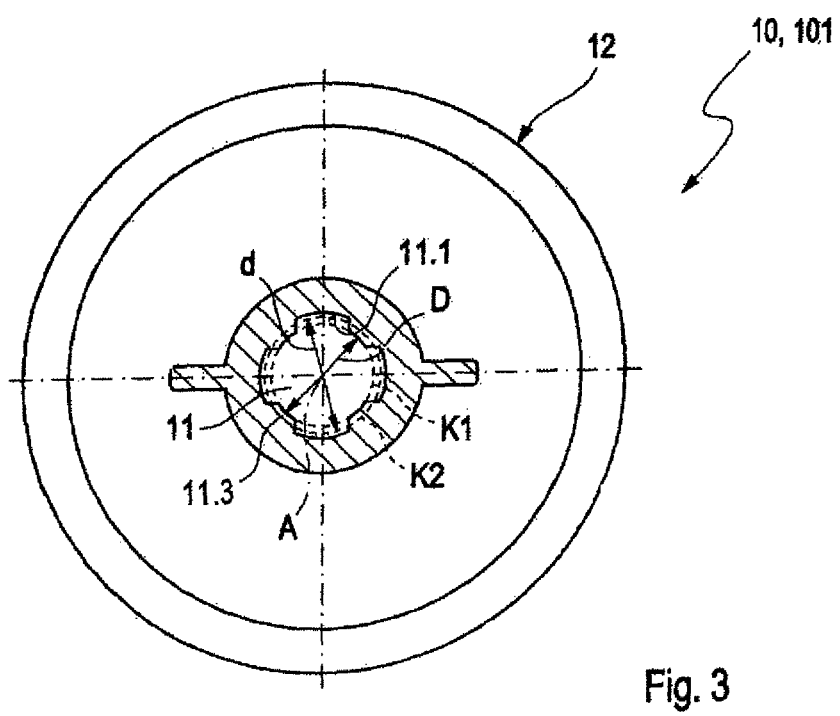
FIG. 3 is a sectional view of the cover element, taken along the line B-B in FIG. 2.

FIG. 3 is a sectional view of the cover element 10, taken along the line B-B in FIG. 2, and it can be seen that the receiving opening 11 has a profiled inner circumferential surface 11.1 to define several wall sections 11.2 in longitudinal direction A. The wall sections 11.2 are configured as flow ribs and evenly spaced about the circumferential surface 11.1 (cf. FIG. 2). The apexes of the flow ribs 11.3 define an inner circle K1 of a diameter D which is smaller than an outer diameter d of the shaft portion 1.2 of the press-in bolt 1. The shaft portion 1.2 defines an outer circle K2 having the outer diameter d, as shown in FIG. 3.

As die 101 of the joining tool 100, the cover element 10 is placed upon a die table 106 of the joining tool 100. For connecting the press-in bolt 1 with the metal sheet 2, the press-in bolt 1 and the cover element 10 are placed together into the joining tool 100, with the metal sheet 2 positioned on the die table 106 and thus resting against the flange 1.2 of the cover element 10.

Figure 4:
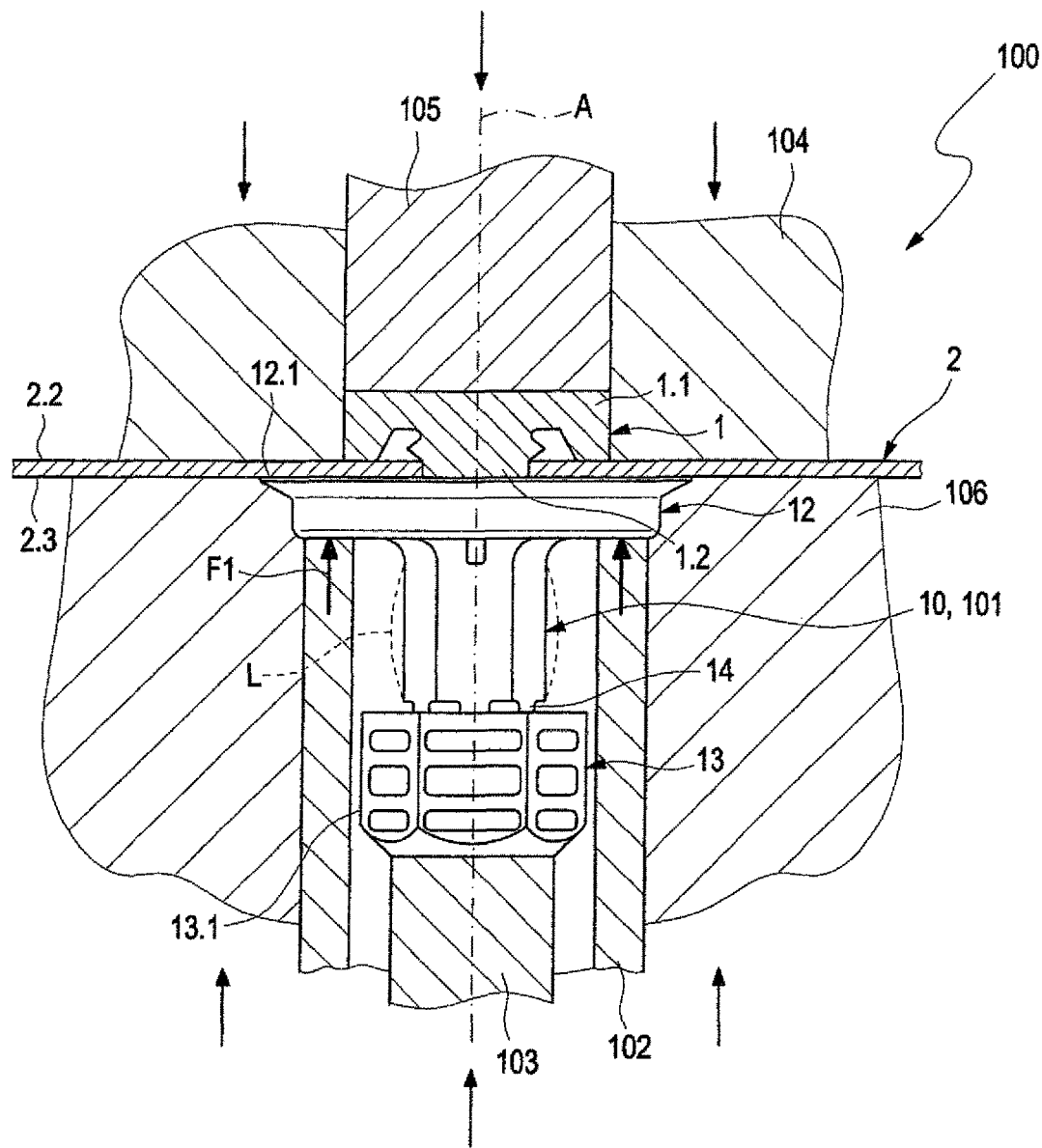
FIG. 4 is a schematic sectional view of the arrangement of FIG. 1, depicting a process state of the method according to the present invention.

The setting head 104 and the pressing and joining ram 105 jointly press the press-in bolt 1 into the metal sheet 2 via the pilot hole 2.1 thereof until the head portion 1.1 of the press-in bolt 1 bears upon the side 2.2 of the metal sheet 2. At the same time, a further first pressing and joining ram 102 of the joining tool 100 applies pressure on the flange 12 to push the cover element 10 as die 101 over the shaft portion 1.2 with high process force F1, until the sealing lip 12.1 bears on the side 2.3, opposite to side 2.2, of the metal sheet 2. This process step is shown in FIG. 4. The first pressing and joining ram 102 remains in this end position so that the cover element 10 is maintained under tension by the process force F1 via the sealing lip 12.1 upon the metal sheet 2.

The connection of the press-in bolt 1 with the metal sheet 2 is realized via the protuberance 2.4, which snaps in a circumferential groove 1.3 of the shaft portion 1.2, as the press-in bolt 1 is forced via the pilot hole 2.1 into the metal sheet 2 to thereby realize a so-called snap connection.

As the apexes of the flow ribs 11.2 lie on the inner circle K1 of smaller diameter D than the outer diameter d of the shaft portion 1.2 of the press-in bolt 1, the section I of the cover element 10 is deformed in radial direction and widens, as shown by the broken line L in FIG. 4. At the same time, the flow ribs 11.2 are slightly pushed into the thread 1.20 of the shaft portion 1.2.

Figure 5:
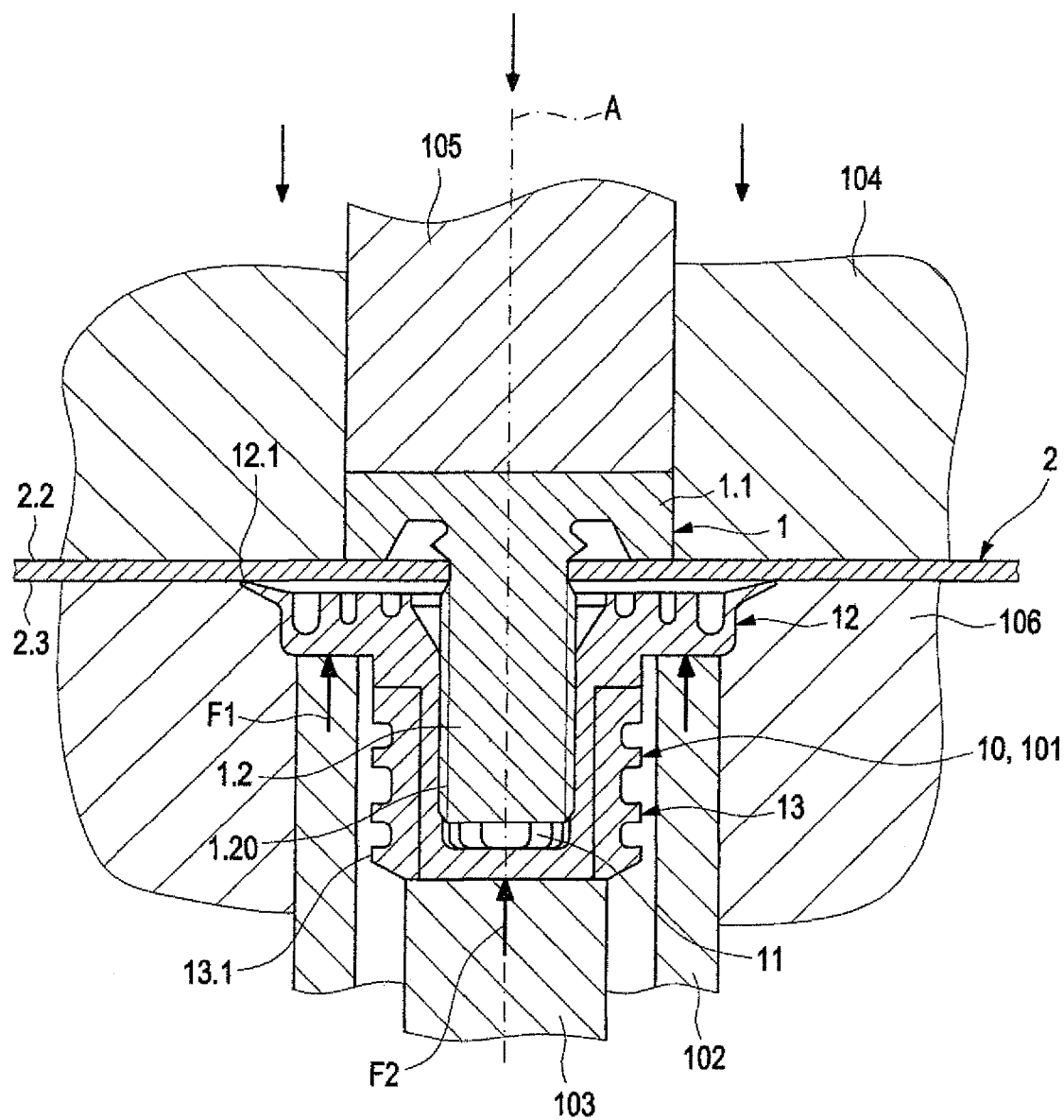
FIG. 5 is a schematic sectional view of the arrangement of FIG. 1, depicting another process state of the method according to the present invention.

In a further process step, a second pressing and joining ram 103 applies a process force F2 upon the sliding sleeve 13 to move the siding sleeve 13 over the section I of the cover element 10. This is shown in FIG. 5. For this purpose, the sliding sleeve 13 has an inner diameter d1 which corresponds to an outer diameter D1 of the cover element 10 in the area of its section 1 in a non-deformed state, i.e., when the cover element 10 has not yet been pressed upon the shaft portion 1.2 (cf. FIG. 2). Application of the process force F2 causes initially the predetermined breaking web 14 to break before the sliding sleeve 13 is pushed onto the radially widened section I of the cover element 10. As a result, the circumferential wall of the cover element 10 is pressed back against the thread 1.20 so that the flow ribs 11.2 form into the thread 1.20. Thus, the cover element 10 is maintained in place by the contact force F1, i.e. "locked" in place. This ensures tightness between the cover element 10, in particular its sealing lip 12.1, and the metal sheet 2.

After undergoing electro-deposition painting with subsequent passage of the metal sheet 2 through a furnace, the cover element 10 is unscrewed from the shaft portion 1.2. For that purpose, the sliding sleeve 13 is provided about its outer circumference with engagement members 13.1 which, according to FIG. 1, may have a hexagonal configuration. Also a cross recessed configuration is conceivable.

The cover element 10 may be made in the form of a single-piece injection molded plastic part, with the sliding sleeve 13 being connected as section II via a thin predetermined breaking web 14 with the cap-shaped section I of the cover element 10.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A cover element, comprising:
   a receiving opening and configured for press-fitting upon a shaft portion of a press-in bolt, said receiving opening having an inner circumferential surface with malleable wall sections which extend in an axial direction and are spaced from one another about the inner circumferential surface and which form an inner circle defined by a diameter which is smaller than an outer diameter of the shaft portion of the press-in bolt,
   wherein the press-in bolt is forced in a pilot hole of a metal sheet positioned upon the cover element as the metal sheet is supported by the cover element in its capacity as a die, until a head portion of the press-in bolt rests upon one side of the metal sheet and the cover element is pressed upon a profiled shaft portion of the press-in bolt and radially deformed to rest upon another opposite side of the metal sheet,
   wherein the cover element is formed detachably at an end of the cover element in an area distal to the receiving opening with a sliding sleeve which is defined by an inner diameter in correspondence with an outer diameter of the die in an non-deformed state, and
   wherein the sliding sleeve is moved over the cover element to thereby press the cover element upon the shaft portion.

2. The cover element of claim 1, wherein the cover element is formed with a radial flange in an area proximal to the receiving opening, said radial flange having a marginal area in the form of an elastically yielding sealing lip.

3. The cover element of claim 1, wherein the sliding sleeve has engagement members for engagement by a tool.

4. The cover element of claim 1, wherein the cover element is cap-shaped.

5. The cover element of claim 1, wherein the wall sections are configured as flow ribs.

6. The cover element of claim 1, wherein the flow ribs are evenly spaced about the inner circumferential surface of the receiving opening.

* * * * *